United States Patent
Oyama

(10) Patent No.: US 8,537,431 B2
(45) Date of Patent: *Sep. 17, 2013

(54) LIGHT SOURCE DRIVING DEVICE, AND IMAGE PROCESSING DEVICE, IMAGE READING DEVICE AND IMAGE FORMING APPARATUS USING THE LIGHT SOURCE DRIVING DEVICE

(75) Inventor: Tadaaki Oyama, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 192 days.

This patent is subject to a terminal disclaimer.

(21) Appl. No.: 13/073,200

(22) Filed: Mar. 28, 2011

(65) Prior Publication Data
US 2011/0249069 A1    Oct. 13, 2011

(30) Foreign Application Priority Data
Apr. 12, 2010    (JP) .................................. 2010-091543

(51) Int. Cl.
*H04N 1/04*    (2006.01)
(52) U.S. Cl.
USPC ........... 358/474; 358/475; 358/509; 399/220; 347/129
(58) Field of Classification Search
USPC ................. 358/475, 509, 474, 501, 488, 448; 347/129; 399/220
See application file for complete search history.

(56) References Cited

U.S. PATENT DOCUMENTS

| | | | | |
|---|---|---|---|---|
| 6,636,190 B2 * | 10/2003 | Hirakata et al. | ............. | 345/74.1 |
| 7,138,974 B2 * | 11/2006 | Hirakata et al. | ................ | 345/98 |
| 7,564,196 B2 | 7/2009 | Shiwaya et al. | | |
| 7,663,500 B2 * | 2/2010 | Curran et al. | ............ | 340/815.45 |
| 7,679,602 B2 * | 3/2010 | Owyeung et al. | ............. | 345/156 |
| 7,737,933 B2 * | 6/2010 | Yamano et al. | ................. | 345/94 |
| 7,902,769 B2 * | 3/2011 | Shteynberg et al. | .......... | 315/291 |
| 7,919,931 B2 * | 4/2011 | Kurumisawa | ................. | 315/291 |
| 8,030,853 B1 * | 10/2011 | Wong et al. | .................... | 315/247 |
| 8,042,202 B2 * | 10/2011 | Parsons et al. | .................... | 4/623 |
| 8,232,743 B2 * | 7/2012 | Chen et al. | .................... | 315/307 |
| 8,299,988 B2 * | 10/2012 | Oishi et al. | ....................... | 345/82 |
| 8,305,011 B2 * | 11/2012 | Kitagawa et al. | ............. | 315/307 |
| 8,344,638 B2 * | 1/2013 | Shteynberg et al. | .......... | 315/247 |
| 2008/0100232 A1 * | 5/2008 | Miguchi | ........................ | 315/294 |
| 2010/0194294 A1 * | 8/2010 | Kitagawa et al. | ............. | 315/161 |

FOREIGN PATENT DOCUMENTS

| | | |
|---|---|---|
| JP | 2008-187816 | 8/2008 |
| JP | 2008-236869 | 10/2008 |

\* cited by examiner

Primary Examiner — Negussie Worku
(74) Attorney, Agent, or Firm — Oblon, Spivak, McClelland, Maier & Neustadt, L.L.P.

(57) ABSTRACT

A light source driving device for driving plural light sources is provided. The light source driving device includes a voltage booster to boost a voltage from a power source to supply the boosted voltage to each of the plural light sources; a constant current driver to regularly hold driving current of each of the plural light sources constant; a load to consume substantially the same power as the plural light sources; and a switch to selectively connect either the load or the plural light sources with the voltage booster and the constant current driver so that the load or the plural light sources are interposed between the voltage booster and the constant current driver.

15 Claims, 10 Drawing Sheets

FIG. 11
RELATED ART
(a) REGULAR LIGHTING
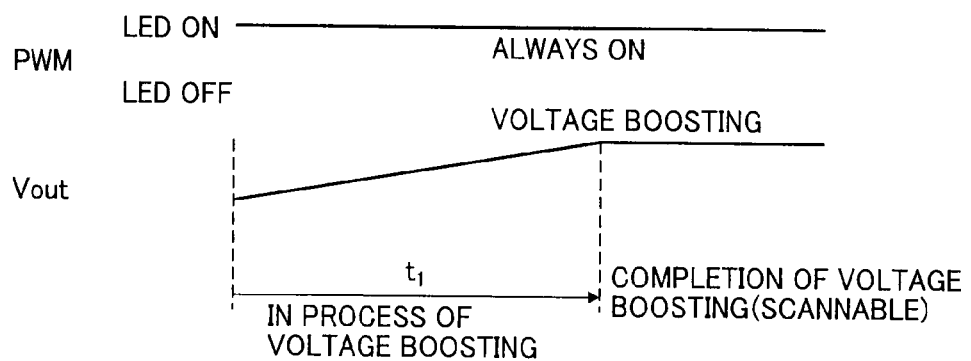
(b) PWM LIGHTING
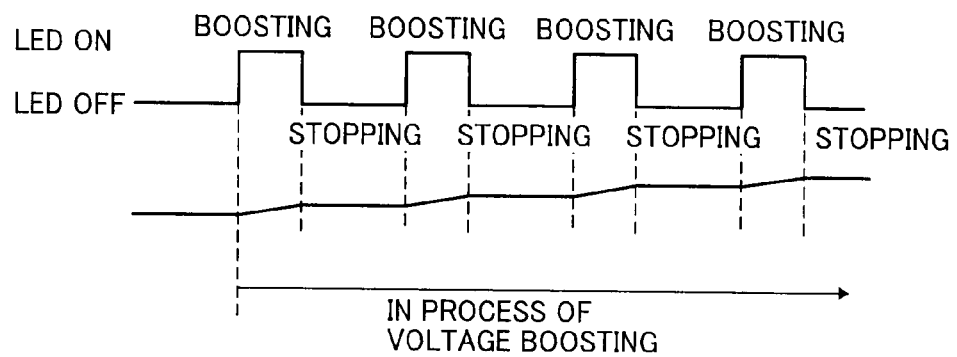

LIGHT SOURCE DRIVING DEVICE, AND IMAGE PROCESSING DEVICE, IMAGE READING DEVICE AND IMAGE FORMING APPARATUS USING THE LIGHT SOURCE DRIVING DEVICE

BACKGROUND OF THE INVENTION

1. Field of the Invention

The present invention relates to a light source driving device to drive plural light sources. In addition, the present invention also relates to an image processing device, an image reading device and an image forming apparatus using the light source driving device.

2. Description of the Related Art

There are light sources in which plural chip light emitting diodes (LEDs) are arrayed. When driving such light sources, it is effective to drive as many LEDs as possible using one driver. Therefore, many commercial LED driver ICs (hereinafter referred to as LED drivers) have a voltage boosting function to boost a supply voltage to supply the boosted voltages to such LEDs. Since LEDs are semiconductor parts, they have a good combination of luminous efficiency and response, and can emit high-intensity light with a relatively low power consumption. In addition, LEDs have an advantage such that it is substantially unnecessary to wait for stabilization of the quantity of light emitted thereby, i.e., it is substantially unnecessary to take a wait time before performing scanning using the LEDs.

However, since no power is needed in such conventional LED drivers (and their peripheral circuitries) except for a LED lighting period in which the LEDs are in a lighting state (i.e., the LEDs operate as loads), a voltage boosting operation cannot be performed except for the period. Therefore, when pulse width modulation (PWM) lighting control is performed as illustrated in FIG. 11(b), the voltage boosting operation is divided (i.e., multiple voltage boosting operations have to be performed at intervals), and the voltage boosting operation spends a time, which is 1/D times an operating time ($t_1$) in a case of regular lighting operation illustrated in FIG. 11(a), wherein D represents the duty and is greater than 0 and less than 1. Therefore, it is necessary for such conventional LED drivers to spend a relatively long wait time from lighting of LEDs to start of a scanning operation, thereby causing a problem in that the first copy time is delayed, resulting in deterioration of throughput (productivity) of the image forming operation.

When voltage boosting is performed while always lighting LEDs in order to perform the voltage boosting operation at a high speed, the LEDs emit an excessive quantity of light. In this case, charge coupled device image sensors (hereinafter referred to as CCDs) receive an excessive quantity of light, and it is likely that output characteristics of all of the parts of the circuit such as CCDs reach saturation points thereof, thereby causing a problem in that it takes a considerable amount of time until the parts are recovered or a part damaging problem in that the parts are broken due to generation of an excessive voltage. Thus, the high-speed light-quantity rising property of LEDs cannot be fully exhibited.

In attempting to reduce power consumption and to improve operation stability of a booster circuit, a technique is proposed in which when the battery voltage is higher than a predetermined voltage, a dummy load is connected in series with a load, and when the battery voltage is not higher than the predetermined voltage, the dummy load is shorted by a switch.

However, the technique has a drawback in that since the LED of the circuit is lighted, the problem in that the parts such as CCDs and parts of the signal processing circuit have the saturated states and excessive voltage is generated cannot be solved.

For these reasons, the present inventors recognized that there is a need for a light source driving device which drives plural light sources such as LEDs and which performs a voltage boosting operation at a high speed without forming an excessive voltage for parts of the circuit receiving light emitted by the light sources.

SUMMARY

This patent specification describes a novel light source driving device for driving plural light sources, one embodiment of which includes a voltage booster to perform a voltage boosting operation of boosting a supply voltage to supply the boosted voltage to each of the light sources; a constant current driver to regularly hold the driving current for each of the light sources constant; a load to consume substantially the same power as the light sources; and a switch to selectively connect either the load or the plural light sources with the voltage booster and the constant current driver while interposing the load or the plural light sources therebetween.

This patent specification describes a novel image processing device, one embodiment of which includes plural light sources to irradiate an object; the above-mentioned light source driving device to drive the plural light sources; an image sensor to receive light reflected from the object while generating analog signals; and a processor to process the analog signals.

The image processing device can be used as an image reading device for reading image data of an object.

This patent specification describes a novel image forming apparatus, one embodiment of which includes the above-mentioned image reading device to read image data of an object; and an image forming device to form an image on a recording material according to the read image data. Alternatively, the image forming apparatus includes plural light sources to irradiate an object; the above-mentioned light source driving device to drive the plural light sources; and an image forming device in which an image bearing member, which is previously charged by a charger, is irradiated with light reflected from the object to form an electrostatic latent image on the image bearing member.

BRIEF DESCRIPTION OF THE DRAWINGS

A more complete appreciation of aspects of the invention and many of the attendant advantage thereof will be readily obtained as the same become better understood by reference to the following detailed description when considered in connection with the accompanying drawings, wherein:

FIG. 11 is a schematic view illustrating the operation of a conventional LED driver and a peripheral circuit thereof just after a LED is lighted.

DESCRIPTION OF THE PREFERRED EMBODIMENTS

The light source driving device of the present invention for driving plural light sources includes a load (second load) to consume substantially the same power as the plural light sources (first load); a voltage booster to perform a voltage boosting operation of boosting a supply voltage to supply the boosted voltage to each of the light sources; a constant current driver to regularly hold the driving current of each of the light sources constant; and a switch to selectively connect either the load or the plural light sources with the voltage booster and the constant current driver while interposing the load or the plural light sources therebetween. When the plural light sources start to be lighted, the load is connected with the voltage booster to boost the supply voltage supplied from a power source, and then the plural light sources are connected with the voltage booster instead of the load after the voltage boosting operation is completed. Thus, the supply voltage is always boosted, and therefore the image reading operation, in which an object is irradiated with light beams emitted by the plural light sources and the light beams reflected from the object are received by an image sensor, can be performed at a high speed without generating an excess voltage in parts of the image processing device, image reading device and image forming apparatus.

The present invention will be specifically described by reference to drawings. Although a LED is used for the light source in the below-mentioned examples, other light sources can also be used therefor.

In the below-mentioned examples, the light source driving device has the following features in a voltage boosting operation performed at the beginning of the LED driving operation.

Specifically, the light source driving device includes a switch to selectively connect either plural LEDs (i.e., first load) or a load (i.e., second load) consuming substantially the same power as the plural LEDs (i.e., having the same load as the plural LEDs) with a voltage booster and a constant current driver. When the plural LEDs start to be lighted, the second load is connected with the voltage booster to boost the supply voltage from a power source, and then the plural LEDs are connected with the voltage booster to regularly supply the boosted voltage to the LEDs.

Initially, a first embodiment of the present invention will be described by reference to FIGS. 1 and 2.

Figure 1:
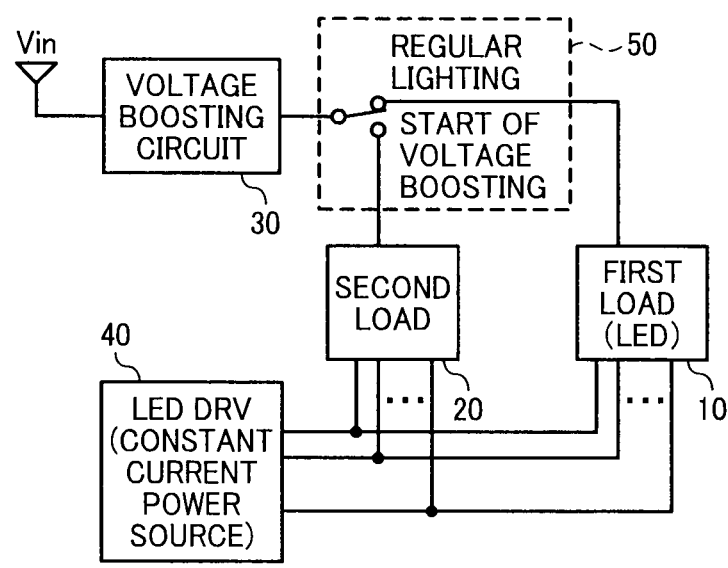
FIG. 1 is a circuit diagram illustrating an example of basic configuration of the light source driving device of the present invention.

FIG. 1 is a circuit diagram illustrating an example of basic configuration of the light source driving device of the present invention.

The light source driving device illustrated in FIG. 1 includes a first load 10, a second load 20, a voltage boosting circuit 30, a LED driver 40, and a switching circuit 50.

The first load 10 represents a light source (i.e., plural LEDs). The second load 20 is a load such as a resistor, which consumes substantially the same power as the first load 10. The voltage boosting circuit 30 is a voltage booster to boost a supply voltage (i.e., reference voltage) Vin supplied by a power source to supply the boosted voltage to the first load (plural LEDs). The LED driver 40 includes a constant current power source (i.e., constant current circuit) and serves as a constant current driver to regularly stabilize the driving current for the first load 10, to which the boosted voltage is applied.

The switching circuit (switch) 50 is a switch to selectively connect either the first load 10 or the second load 20 with the voltage boosting circuit 30 and the LED driver 40 while interposing the first load or the second load therebetween. The switching circuit 50 connects the second load 20 with the voltage boosting circuit 30 until the voltage boosting operation of the voltage booster 30 is completed and connects the first load 10 (i.e., plural LEDs) with the voltage booster 30 after completion of the voltage boosting operation.

Figure 2:
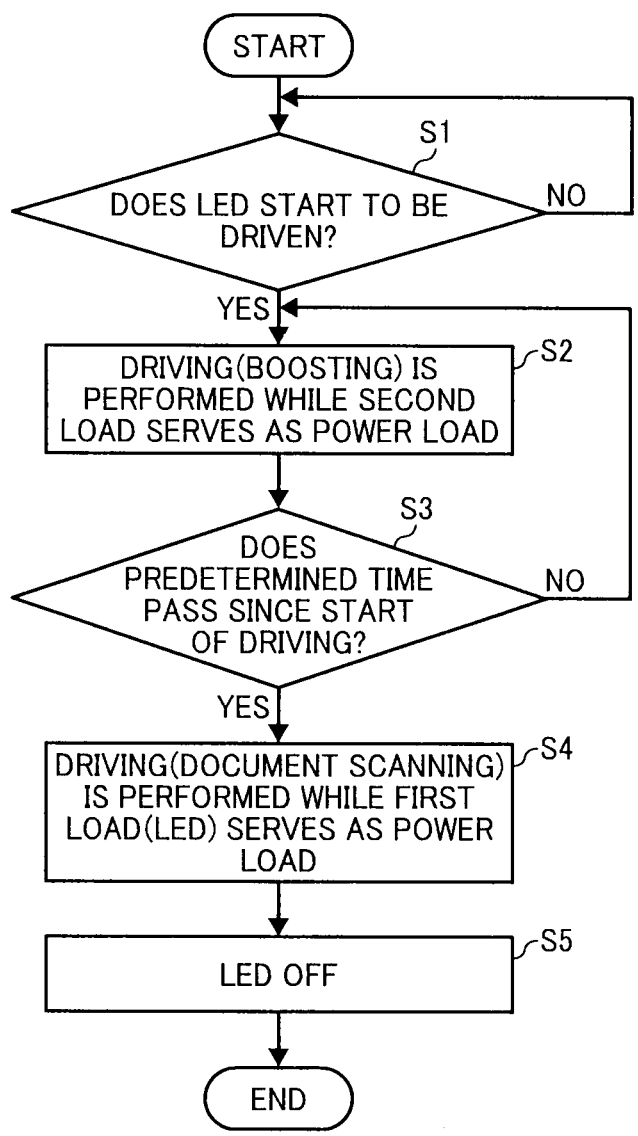
FIG. 2 is a flowchart illustrating the operation of a timing clock generator of a scanner equipped with the light driving circuit illustrated in FIG. 1.

FIG. 2 is a flowchart illustrating the operation of a timing clock generator of a scanner equipped with the light driving circuit illustrated in FIG. 1. The configuration of such a scanner will be described later in detail.

Referring to FIG. 2, when the first load (plural LEDs) 10 is in an OFF state, the timing clock generator of the scanner waits a LED driving start signal to be input thereto from a CPU (not shown) in step S1.

When a LED driving start signal is input thereto, step S2 is executed. In step S2, a start signal is input to the LED driver 40 to start the LED driver 40, and a control signal for switching the loads (i.e., switch signal) is set to a high level "H" so that the second load 20 serves as the power load.

When the switch signal from the timing clock generator attains the high level "H", the switching circuit 50 performs such a switching operation as to connect the second load 20 with the voltage boosting circuit 30, and thereby the LED driver 40 starts the internal constant current power source and the voltage boosting circuit 30 to start to light the LEDs. Thereby, boosting of the supply voltage supplied by a power source is started by the voltage boosting circuit 50.

In this regard, the voltage boosting operation is performed in order to drive as many LEDs as possible per a LED driver (one chip of driver).

In conventional light source driving devices, at a time just after start of an operation of lighting a LED, the LED is in an OFF state, and is not used as a load (i.e., the LED consumes no power), thereby not performing a voltage boosting operation. Therefore, for example, in a lighting operation using a PWM drive control signal in which driving and stopping of the LED are repeated, the voltage boosting operation in the start of the LED lighting operation is performed at intervals, and therefore the voltage boosting operation spends a longer time than in a case of regular lighting operation.

In this embodiment, the second load 20 different from the first load (plural LEDs) 10 is used for the voltage boosting operation until completion of the voltage boosting operation, and the voltage boosting operation is completed without lighting the first load (LEDs), thereby shortening the wait until the first load is lighted.

Referring back to FIG. 2, in step S3 the timing clock generator waits until a predetermined time passes since start of lighting of the LEDs. When the predetermined time passes (i.e., the voltage boosting operation is completed), the switch signal is changed to a low level "L" to drive the light source driving device while using the first load 10 as the power load (i.e., the below-mentioned document scanning operation is performed) (step S4). When the document scanning operation is completed, input of the start signal to the LD driver 40 is stopped to turn the first load (LEDs) 10 off (step S5).

When the switch signal from the timing clock generator is changed to a low level "L", the switching circuit 50 performs such a switching operation as to connect the first load (LEDs) 10 with the voltage boosting circuit 30 to perform a regular LED lighting operation, thereby making it possible that the scanner equipped with the light source driving device can scan an original document, resulting in reading of the image of the document.

Specifically, just after the LED lighting operation, the voltage supplied from the power source is boosted using the second load 20, and after a predetermined time (i.e., when the voltage reaches a voltage capable of driving the LEDs), the driving (PWM driving) is performed using the first load (LEDs) 10 as the load.

In this regard, instead of checking the time in step S3, the switching operation may be performed when the boosted voltage reaches a predetermined voltage. However, the method has to use a complex circuit, and therefore it is preferable to perform the switching operation by checking the time. Specifically, the predetermined time in step S3 corresponds to the wait for stabilization of the light quantity before start of scanning, and therefore conventional software can be used as itself.

The light source driving device according to an embodiment of the present invention includes a load (i.e., second load) consuming substantially the same power as plural LEDs (i.e., first load) and a switch to selectively connect either the plural LEDs or the second load with a voltage booster and a constant current driver while interposing the LEDs or the second load therebetween. When the plural LEDs start to be lighted, the second load is connected with the voltage booster to boost the supply voltage supplied from a power source, and after the voltage boosting operation is completed, a switching operation is performed so that the plural LEDs are connected with the voltage booster to regularly supply the boosted voltage to the LEDs.

In addition, since a constant current power source is commonly used for the first load (LEDs) and the second load, difference in boosting rate (i.e., error caused by characteristics of the first load and second load) can be minimized, and a voltage adjustment operation is substantially unnecessary after the load switching operation, resulting in speeding up of the voltage boosting operation. Further, each of the LEDs is not lighted at the beginning of the voltage boosting operation, thereby preventing generation of an excessive voltage in the parts (such as CCDs and signal processing circuits) of the image processing device, the image reading device and the image forming apparatus, which receive light reflected from an object, which the LED light source irradiates, resulting in prevention of damage to the parts.

Next, a second embodiment of the present invention will be described by reference to FIGS. 3 and 4.

Figure 3:
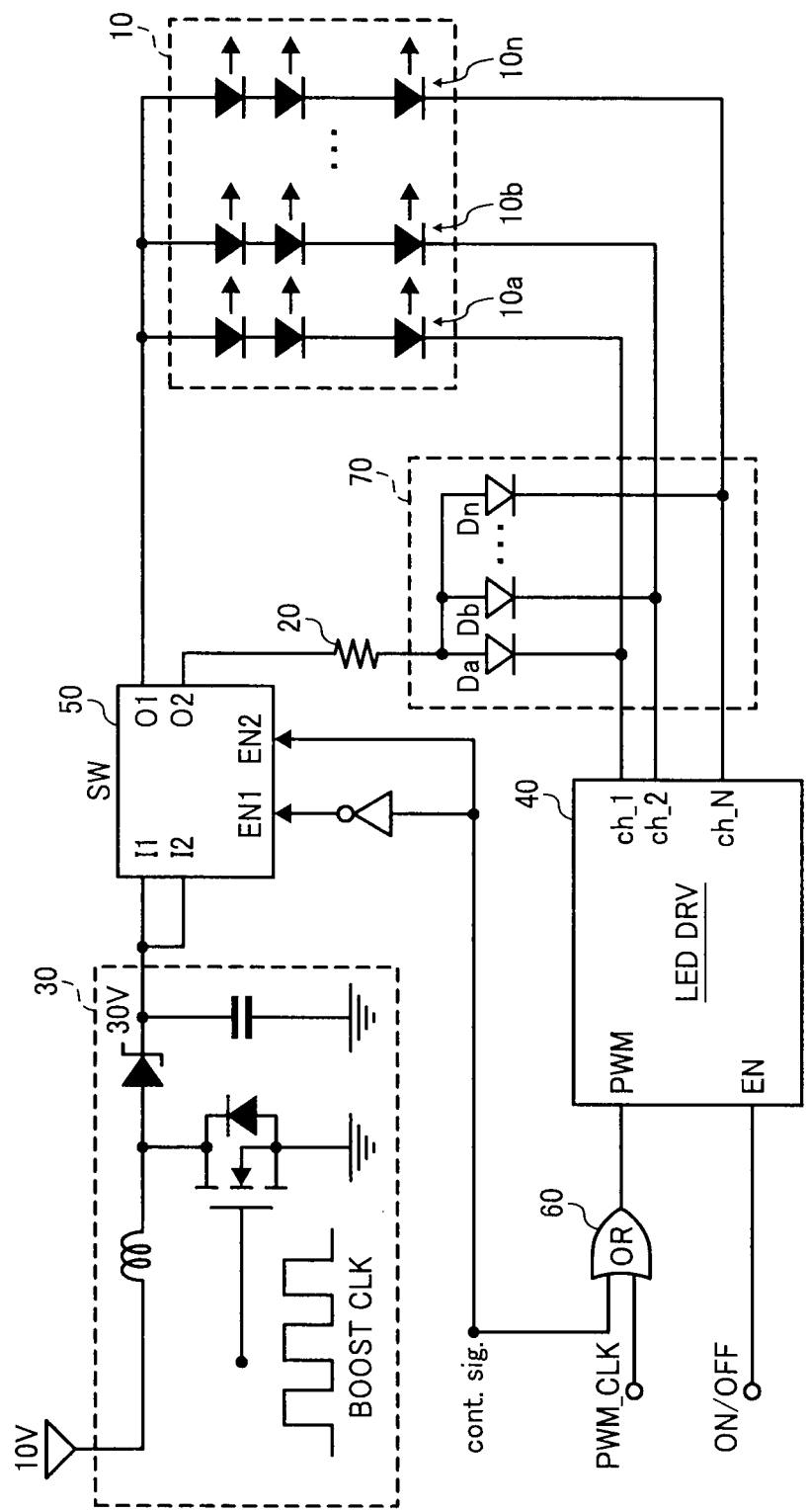
FIG. 3 is a circuit diagram illustrating an example of specific configuration of the light source driving device of the present invention.

FIG. 3 is a circuit diagram illustrating an example of specific configuration of the light source driving device of the present invention. In FIGS. 1 and 3 like reference characters designate corresponding parts.

This light source driving device is an applied example of the above-mentioned light source driving device according to the first embodiment of the present invention. The first load 10 is constituted of plural LED arrays 10a, 10b . . . , and 10n. The above-mentioned switching operation is performed using a control signal (i.e., switch signal, hereinafter sometimes referred to as cont. sig.).

The switch signal cont. sig. is in a high state "H" only in the predetermined period of time between start of driving of the LED driver 40 and completion of boosting of the supply voltage supplied by the power source, and maintains a low state "L" thereafter. Since a PWM drive control signal input to an input terminal PWM of the LED driver 40 is a signal prepared by subjecting a PWM clock signal PWM_CLK and the switch signal cont. sig. to logical addition OR in an OR gate 60, regular constant current driving using the second load (resistor) 20 is performed until the voltage boosting operation is completed, and PWM driving using the first load 10 (i.e., LED arrays 10a, 10b, . . . , and 10n) is performed after completion of the voltage boosting operation. It is possible that the above-mentioned predetermined period of time is set while being changed by an operation signal sent from an external device.

The LED driver 40 monitors the voltages at the output terminals ch_1, ch_2, . . . , and ch_N when the level of the boosted voltage is adjusted. Therefore, when the LED driver 40 performs driving using the second load 20, the load is connected with the same channels as in the case where the first load 10 is used. Accordingly, the switching operation can be easily performed while minimizing change in load.

A shutoff circuit 70 serving as a shutoff device and including diodes Da, Db, . . . , and Dn prevents the first load 10 from being influenced by the second load 20 in the driving operation performed by the LED driver 40. Namely, the shutoff circuit 70 is a breaker to perform an electrical shutoff operation so that the driving current for one of the LED arrays does not flow the other arrays. If this shutoff circuit 70 is not provided, each of channel terminals ch_1, ch_2, . . . , and ch_N is in a short-circuit state or the channel terminals are connected with each other through a load, resulting in occurrence of a problem in that the currents at the channel terminals ch_1, ch_2, . . . , and ch_N of the LED driver 40 are different from those at the LED arrays 10a, 10b, . . . , and 10n.

Figure 4:
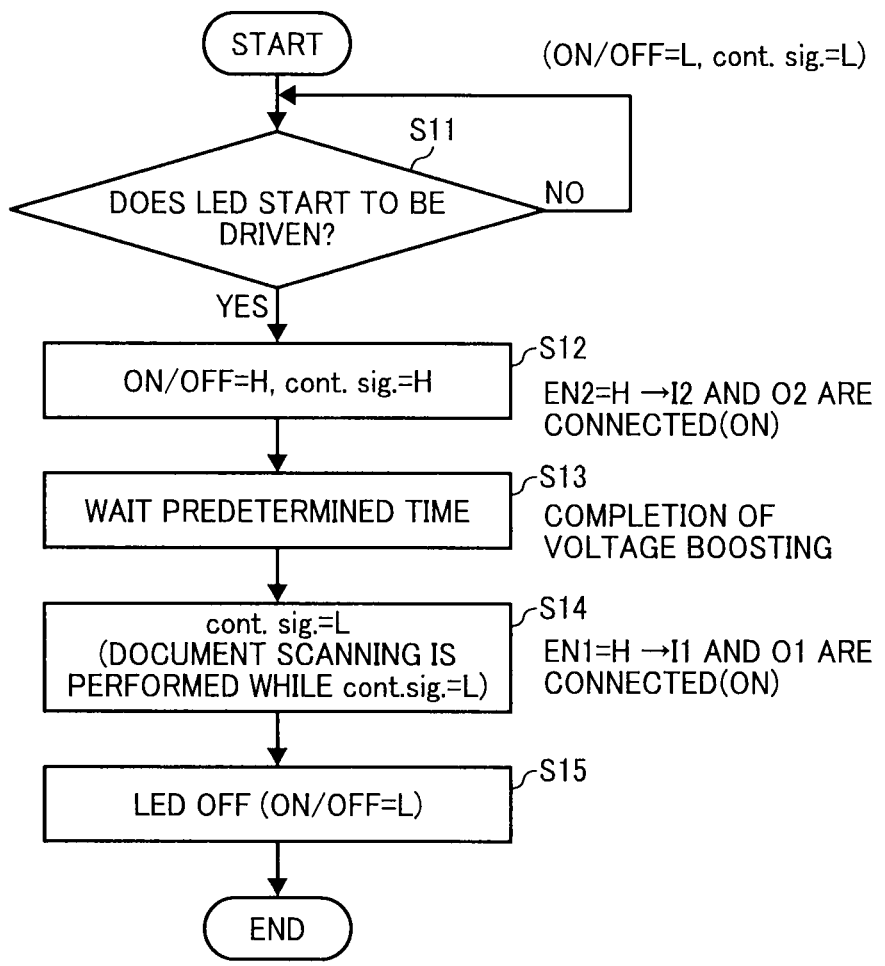
FIG. 4 is a flowchart illustrating the operation of a timing clock generator of a scanner equipped with the light driving circuit illustrated in FIG. 3.

FIG. 4 is a flowchart illustrating the operation of a timing clock generator (not shown) of a scanner including the light driving circuit illustrated in FIG. 3.

Referring to FIG. 4, the timing clock generator of the scanner waits input of a LED driving start signal (step S11). In step S12, an enable signal EN (ON/OFF) to be input to the LED driver 40 is set to a high level "H" to start the LED driver while the switch signal cont. sig. is set to a high level "H" to drive the second load 20 so as to be used as the power load.

When the switch signal cont. sig. input to an enable terminal EN2 by the timing clock generator gains the high level "H", an input terminal I2 and an output terminal O2 in the switching circuit 50 achieve a conducting (ON) state, and the switching circuit 50 performs a switching operation such that the second load 20 is connected with the voltage boosting circuit 30. Therefore, the LED driver 40 activates the internal constant current power source and the voltage boosting circuit 30 to start a LED lighting operation, and thereby an operation of boosting the supply voltage supplied by a power source is started.

In step S13, the timing clock generator waits the predetermined time, i.e., waits completion of the voltage boosting operation. Next, in step S14 the switch signal cont. sig. is set to the low level "L" to drive the light source driving device while using the first load 10 as the power load. After the document scanning operation is completed, the enable signal EN (ON/OFF) to be input to the LED driver 40 is changed to the low level "L" to turn the first load off (step S15).

When the switch signal cont. sig. input to an enable terminal EN1 by the timing clock generator gains the high level "H", an input terminal I1 and an output terminal O1 in the switching circuit 50 achieve a conducting (ON) state, and the switching circuit 50 performs a switching operation such that the first load 20 is connected with the voltage boosting circuit 30. Therefore, the scanner equipped with this light source driving device can read image data of an original document by scanning the original document with light emitted by the light source.

The light source driving device according to the second embodiment of the present invention can produce the below-mentioned effects (a) to (d) in addition to the effects produced by the above-mentioned light source driving device according to the first embodiment.

(a) When the switching circuit performs the load switching operation in synchronization with the switch signal, which is a control signal externally input to switch the loads, the switching operation can be performed at any timing with high precision;

(b) Since the shutoff circuit performs an electrical shutoff operation so that the driving current for one of the LED arrays does not flow the other arrays, occurrence of a problem in that the currents at the channel terminals of the LED driver 40 are different from those at the LED arrays can be prevented;

(c) By using a resistor for the second load, the second load can have a simple structure and low costs; and (d) By using a diode, which is a general-purpose part, for the shutoff circuit, the shutoff circuit can have a simple structure, low costs and high reliability.

Next, a third embodiment of the present invention will be described by reference to FIGS. 5 and 6.

Figure 5:
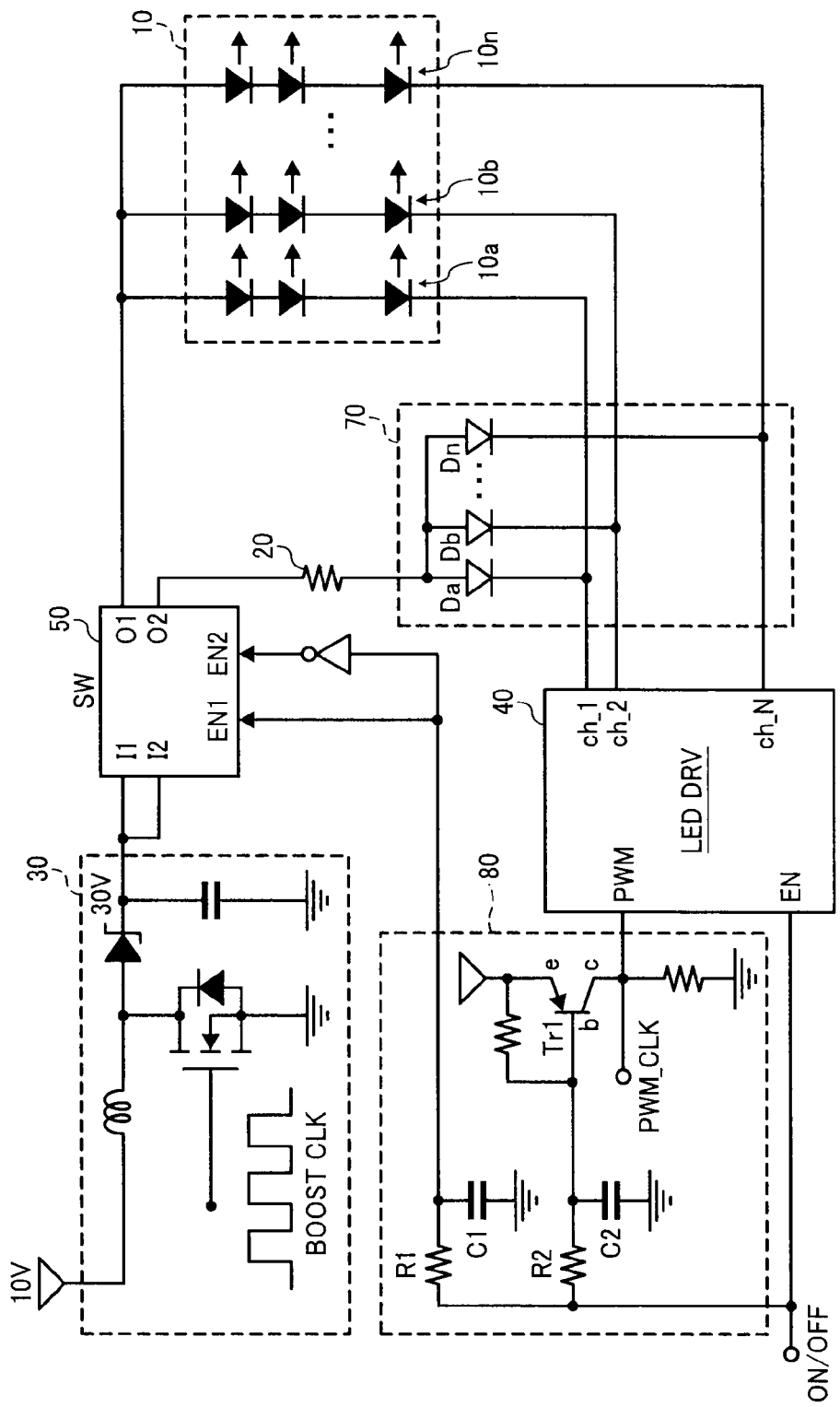
FIG. 5 is a circuit diagram illustrating another example of specific configuration of the light source driving device of the present invention.

FIG. 5 is a circuit diagram illustrating another example of specific configuration of the light source driving device of the present invention. In FIGS. 3 and 5, like reference characters designate like corresponding parts.

The light source driving device illustrated in FIG. 5 is different from the light source driving device illustrated in FIG. 3 in that a RC circuit 80 (or another circuit) serving as a signal generator is provided instead of the switch signal cont. sig. Specifically, when an enable signal EN (ON/OFF) is input from an external device (timing clock generator), the enable signal is delayed by a RC time constant so that the delayed signal has the same function as the switch signal cont. sig.

Figure 6:
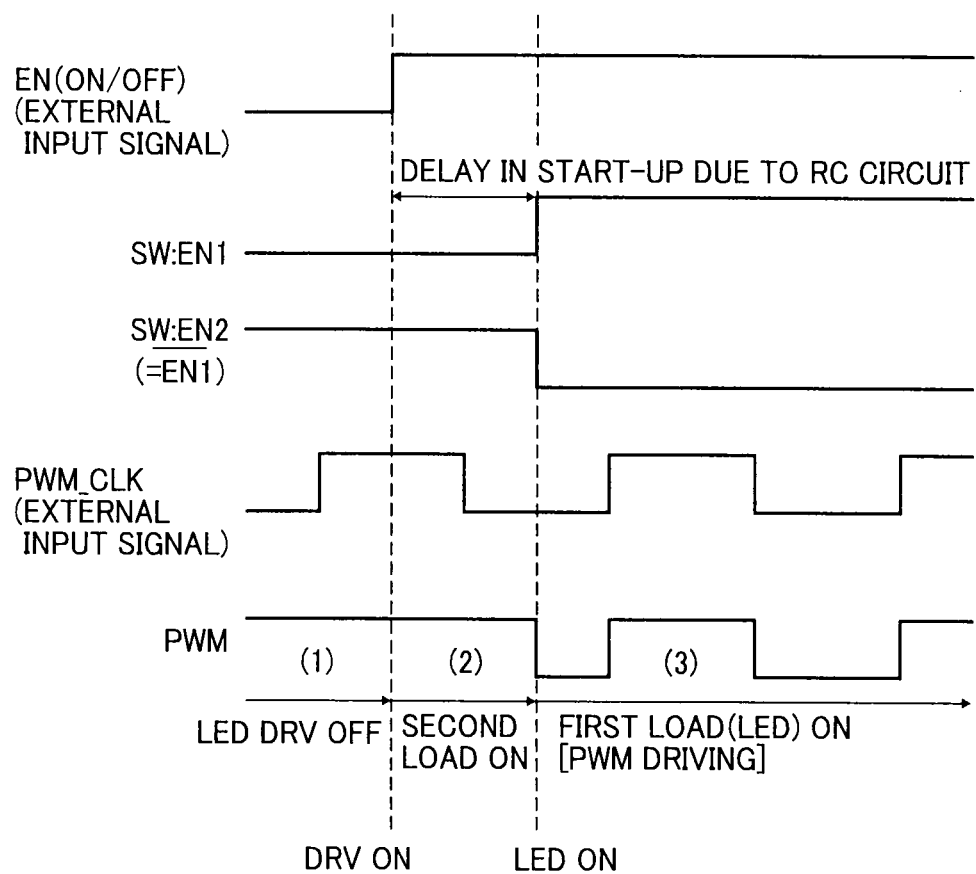
FIG. 6 is a timing chart illustrating timing of input/output signals of the light source driving device illustrated in FIG. 5.

FIG. 6 is a timing chart illustrating timing of signals and operations of the light source driving device illustrated in FIG. 5.

(1) Initially, the enable signal EN (ON/OFF) is on a low level "L", and therefore both the LED driver (DRV) 40 and the first load 10 (i.e., LED arrays 10a, 10b, ..., and 10n) are in an OFF state. In this regard, since the enable signal EN is on a low level "L", a transistor Tr1 of the RC circuit 80 is in an ON state. Therefore, a high level signal, which is the supply voltage supplied by a power source, is input to the input terminal PWM of the LED driver 40, namely, the level of the signal does not depend on the level of the PWM clock signal PWM_CLK.

(2) When the level of the enable signal EN is changed to the high level "H", the LED driver starts to perform a constant current operation and the voltage boosting operation (in reality, the voltage boosting operation of the voltage boosting circuit 30). In this regard, since changes in the voltages of the enable terminals EN1 and EN2 of the switching circuit 50 and a voltage Vbe between a base terminal b and an emitter terminal e of the transistor Tr1 are delayed due to a resistor R1, a condenser C1, a resistor R2, and a condenser C2, the switching operation is delayed by the time constant compared to change of the level of the enable signal EN to the high level.

In this case, since the signal (enable signal EN) input to the enable terminal EN of the LED driver 40 is on the high level "H", the signal input to the input terminal PWM of the driver is also on the high level "H", and the signal to the enable terminal EN2 of the switching circuit (SW) 50 is on the high level "H", driving is started while using the second load 20 as the power load. This operation is continued until the charge levels of the condensers C1 and C2 reach the threshold voltages of the terminals thereof. By using proper resistors and condensers for the resistors R1 and R2 and the condensers C1 and C2 with consideration for the charging time in the charging operation, the switching operation of the switching circuit 50 is automatically performed when the voltage boosting operation is completed.

(3) When the charge levels of the condensers C1 and C2 reach the predetermined threshold levels, the following switching is performed.

(a) Input signal to the PWM terminal: Always "high level "H"→PWM_CLK (because the transistor Tr1 achieves an OFF state)

(b) Power load: second load→first load (because SW EN1 is turned on)

Accordingly, the first load 10 is used as the power load, and the first load is driven by the PWM clock signal PWM_CLK.

The light source driving device according to the third embodiment of the present invention can produce the same effects as those of the light source driving device according to the first embodiment and the above-mentioned effects (b) to (d) of the light source driving device according to the second embodiment. In addition, since the RC circuit generates a signal for allowing the switching circuit to perform the switching operation according to the external signal for activating the LED driver, the light source driving device has relatively simple configuration because the number of the signal lines can be reduced. Further, by properly setting the time constant of the RC circuit, the load switching operation can be timely performed with precision.

Next, a fourth embodiment of the present invention will be described by reference to FIG. 7.

Figure 7:
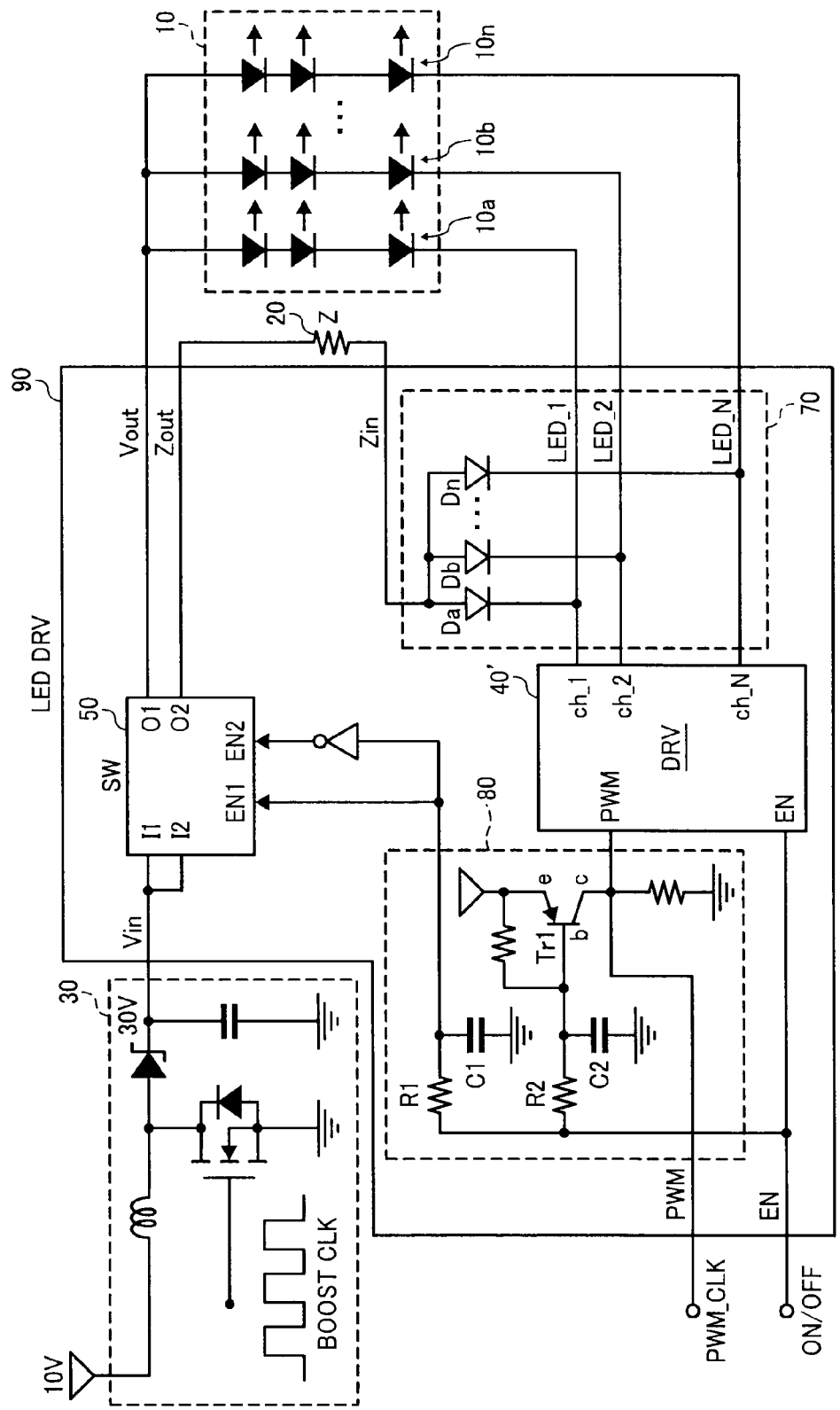
FIG. 7 is a circuit diagram illustrating another example of specific configuration of the light source driving device of the present invention.

FIG. 7 is a circuit diagram illustrating another example of specific configuration of the light source driving device of the present invention. In FIGS. 5 and 7, like reference characters designate like corresponding parts.

The light source driving device illustrated in FIG. 7 includes a LED driver 90, which is an integrated circuit and which includes a driver 40' having substantially the same function as the LED driver illustrated in FIG. 5, the switching circuit 50, the shutoff circuit 70, and the RC circuit 80, and the first load 10 and the second load 20 are attached thereto as external parts to reduce costs while saving space. Since a main load Z of the second load 20 (resistor in this example) is externally attachable to the device, the load (power consumption) of the second load can be adjusted (i.e., a proper load can be attached) with consideration of the load and number of the LEDs constituting the first load 10.

This light source driving device can produce the same effects as the light source driving device according to the above-mentioned second or third embodiment of the present invention. In addition, since part of the light source driving device is constituted of an integrated circuit, the light source driving device has low costs and saves space.

In the above-mentioned first to fourth embodiments, a second load having substantially the same power consumption as the LED light source (i.e., first load) is used. Therefore, the voltage boosting operation can be performed at a high speed. In addition, since the LED light source is not lighted in the voltage boosting operation, the above-mentioned part damaging problem is not caused.

In the below-mentioned fifth and sixth embodiments, an image reading device, which is an image processing device using the light source driving device, and an image forming apparatus using the light source driving device will be described. In this regard, the image processing device is defined as a device, which has the above-mentioned light driving device including plural LED light sources, which irradiate an image of an original document (i.e., object) with light, an image sensor (such as CCDs), which receives light reflected from the image to generate analog signals, and a processor, which converts the analog signals to image signals (i.e., performs image processing).

Next, the fifth embodiment of the present invention will be described by reference to FIGS. 8 and 9.

Figure 8:
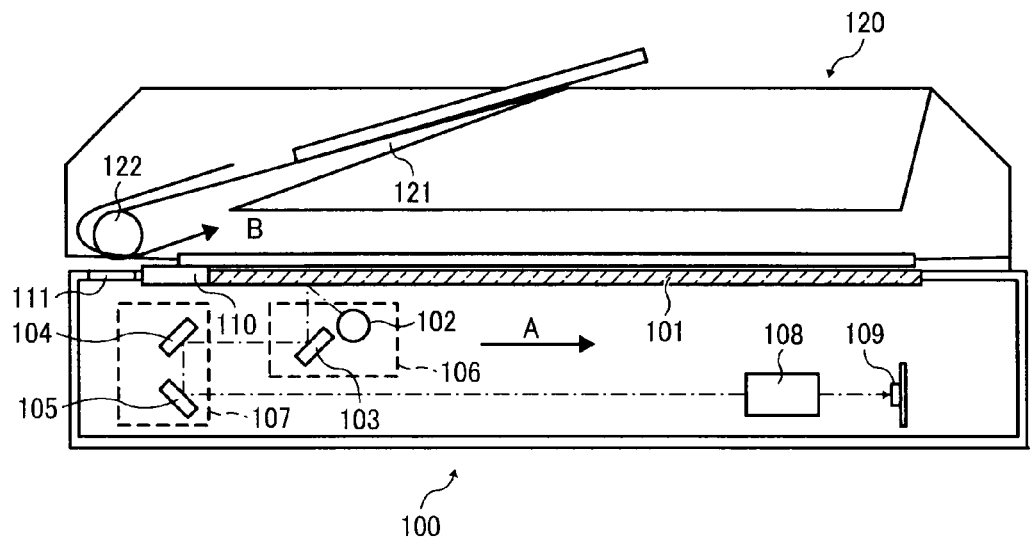
FIG. 8 is a schematic view illustrating an example of the image reading device of the present invention.

FIG. 8 is a schematic view illustrating an example of the image reading device of the present invention.

The image reading device is a scanner or a scanning device which is provided in image forming apparatuses such as digital copiers, digital multifunctional image forming apparatuses and facsimiles. The image reading device includes a light source driving portion corresponding to the above-mentioned light source driving device illustrated in FIG. 1, 3, 5 or 7, and an image signal processor. Specifically, light emitted by the light source (load 10) of the light source driving portion irradiates an original document (object), and light reflected from the original document is received by a CCD, followed by image processing, thereby reading the image data of the original document. Since the signals output by the CCD are analog signals, the analog signals are converted to digital image signals by an A/D converter.

Referring to FIG. 8, an image reading device 100 includes a glass document table 101 on which an original document is to be set; a first carriage 106 including a light source 102 to emit light for use in irradiating the original document, and a first reflection mirror 103; a second carriage 107 including a second reflection mirror 104 and a third reflection mirror 105; a CCD linear image sensor 109 (hereinafter referred to as a CCD); a lens unit 108 to focus reflected light on the CCD; a white reference plate 110 to correct various kinds of distortion caused by the optical reading system; and a reading slit 111 for use in reading a fed original document.

An automatic document feeder 120 (hereinafter referred to as an ADF) is provided on the image reading device 100. The ADF 120 is engaged with the image reading device 100 using a hinge or the like so as to be opened and closed relative to the glass document table 101. The ADF 120 includes a document tray 121 on which plural original document sheets can be set, and a feeder which includes a feed roller 122 and which feeds the original document sheets one by one toward the reading slit 111.

The image reading device 100 performs the following image scanning operation.

Specifically, in a scan mode in which an original document set on the glass document table 101 is scanned, the first carriage 106 and the second carriage 107 are moved by a stepping motor (not shown) in a direction A (i.e., subs-canning direction). In this regard, the first and second carriages 106 and 107 are moved at different speeds so that the length of the light path is not changed.

While the first and second carriages 106 and 107 are moved, the light source 102 (corresponding to the first load 10 mentioned above) of the first carriage 106 irradiates the lower surface (image surface) of the original document set on the glass document table 101. Light reflected from the image surface is fed to the CCD 109 via the first, second and third reflection mirrors 103-105 and the lens unit 108, resulting in reading of the image of the original document.

In a sheet through mode in which an original document sheet is fed from the ADF 120, the following image reading operation is performed.

Specifically, after the first and second carriages 106 and 107 are moved to a position below the reading slit 111, the original document set on the document tray 121 is automatically fed by the feed roller 122 in a direction B (sub-scanning direction). The light source 102 of the first carriage 106 irradiates the lower surface (image surface) of the thus fed original document at the reading slit 111. Light reflected from the image surface is fed to the CCD 109 via the first, second and third reflection mirrors 103-105 and the lens unit 108, resulting in reading of the image of the original document. Thereafter, the document is discharged from an exit (not shown).

Before the scan mode or sheet through mode image reading operation, the image on the white reference plate 110 is read using the lighted light source 102. According to the result of the operation of reading the image on the white reference plate 110, shading correction for the image reading operation is performed. Since such shading correction can be performed by a known technique, the description thereof is omitted here.

When an ADF having a feeding belt is used, an original document set on the ADF is fed to the glass document table 101 so that the image of the document is read at the glass document table.

Figure 9:
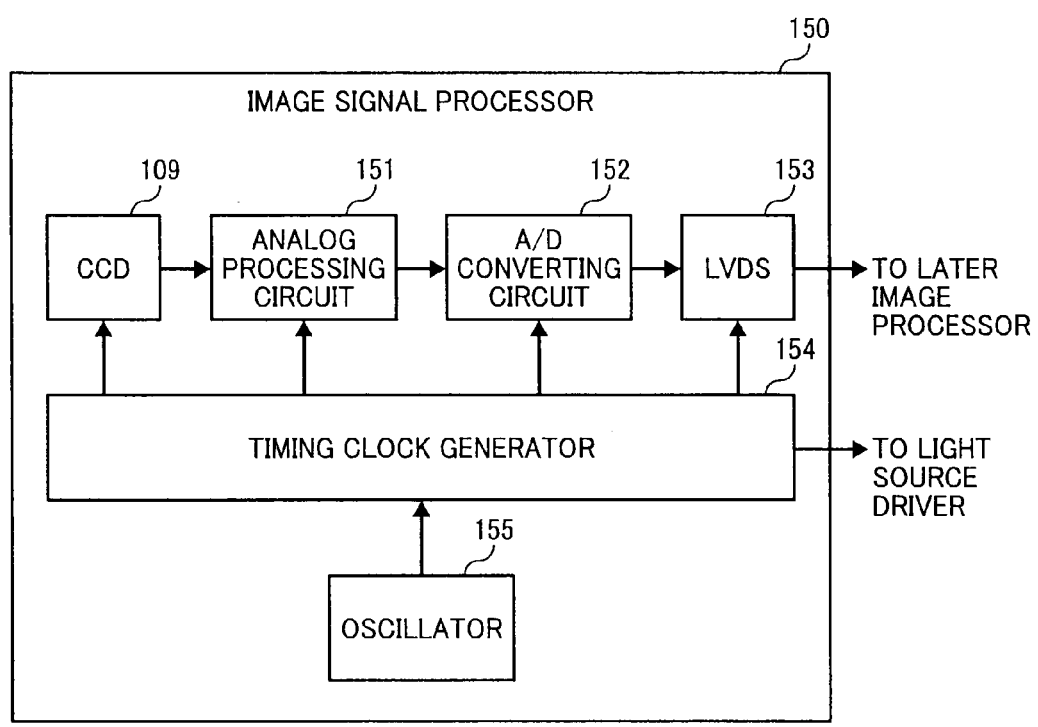
FIG. 9 is a block diagram illustrating a part of the image signal processor of the image reading device illustrated in FIG. 8.

FIG. 9 is a block diagram illustrating apart of the image signal processor of the image reading device 100 illustrated in FIG. 8.

In an image signal processor 150 illustrated in FIG. 9, analog image signals obtained by photoelectric transfer in the CCD 109 are sent to an analog processing circuit 151. The analog processing circuit 151 subjects the analog image signals to image processings such as sample-and-hold processing and black level correction processing, and then inputs the resultant signals to an A/D converter 152.

The A/D converter 152 converts the analog signals, which are output from the analog processing circuit 151, to digital image signals (image data), and then sends the digital image signals to a later image processor via a LVDS interface 153.

Timing clock signals are generated and supplied by a timing clock generator 154 to the CCD 109, the analog processing circuit 151, the A/D converter 152, the LVDS interface 153, and the stepping motor and light source driving device (not shown) under a reference clock signal sent from an oscillator 155.

Some of the timing signals generated by the timing clock generator 154 are input to the light source driving device as the start signal, the switch signal and the like. In this regard, these signals may be generated by a controller using a CPU (not shown in FIG. 9). The light source driving device generates signals (such as reading line signals and light source driving signals synchronized with the timing clock) under the signals generated by the timing clock generator 154 and sends the signals to the LED light source. Therefore, the optical scanning operation can be performed by the light source with minimum variation in light quantity.

Since the image reading device uses the above-mentioned light source driving device of the present invention, the image reading operation in which an original document is irradiated by light beams emitted by plural LED light sources, and light beams reflected from the original document are received, followed by transfer to image signals and image processing, resulting in reading of the image data, can be performed without deteriorating the productivity (throughput) of the image reading operation. In addition, occurrence of the part damaging problem in that the parts in the circuit are broken due to generation of an excessive voltage. Therefore, the image reading operation can be performed at a high speed with high precision, and the read image has good image quality.

Next, the sixth embodiment of the present invention will be described by reference to FIG. 10.

Figure 10:
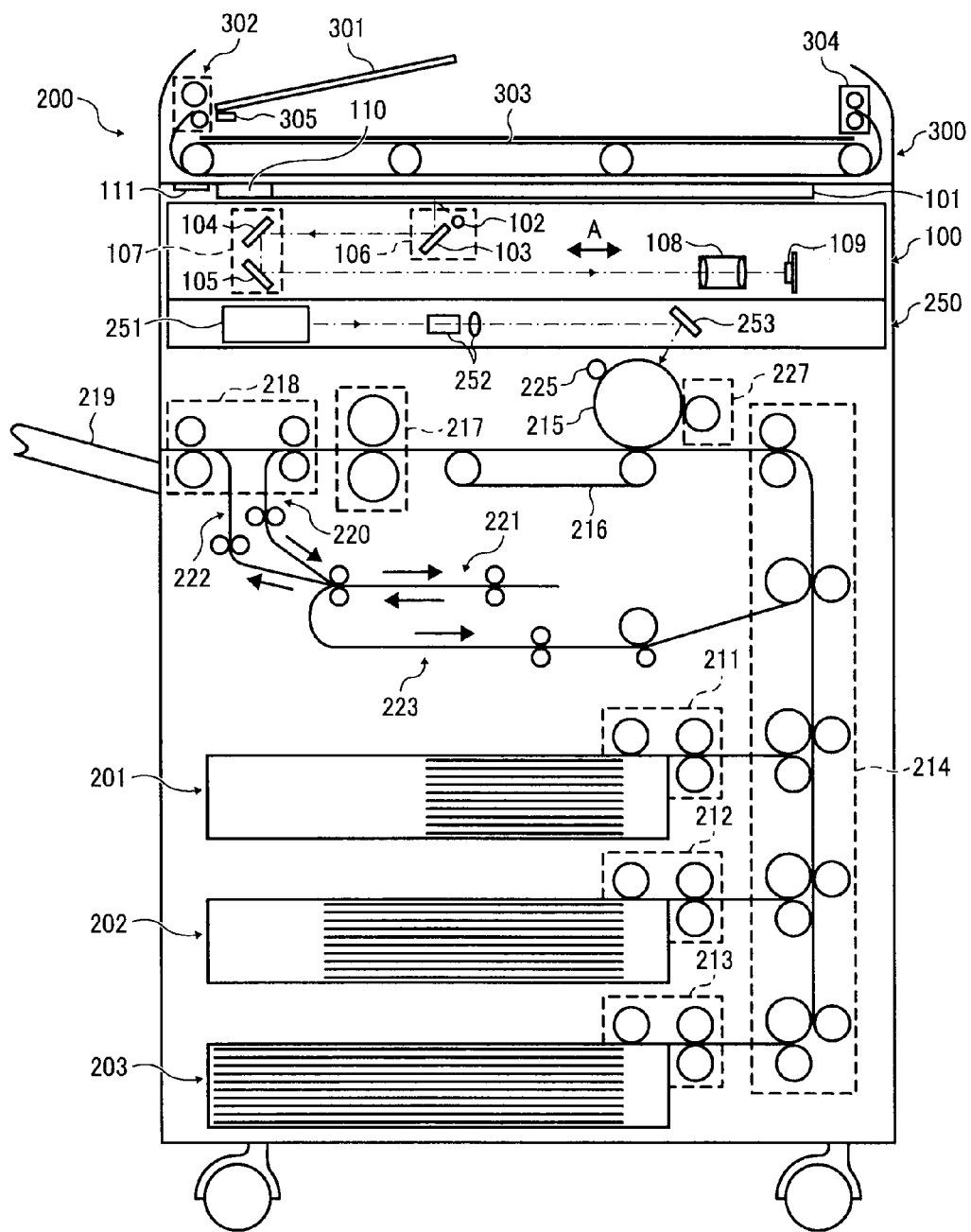
FIG. 10 is a schematic view illustrating an example of the image forming apparatus of the present invention.

FIG. 10 is a schematic view illustrating an example of the image forming apparatus of the present invention. In FIGS. 8 and 10, like reference characters designate like corresponding parts.

Referring to FIG. 10, an image forming apparatus 200 is a digital copier equipped with the image reading device 100, which is illustrated in FIG. 8 and which includes the light source driving device illustrated in FIG. 1, 3, 5 or 7. Similarly to the image reading device illustrated in FIG. 8, the image reading device 100 of the image forming apparatus 200 reads the image data of an original document.

In the image forming apparatus 200, an ADF 300 is provided on the glass document table 101. The ADF 300 is engaged with the image reading device 100 using a hinge or the like so as to be opened and closed relative to the glass document table 101. The ADF 300 includes a document tray 301 on which plural original document sheets can be set, and a feeder which includes a feed roller 302 and a feed belt 303 and which feeds the original document sheets one by one toward the reading slit 111 or the glass document table 101.

After the image of the original document fed by the feed roller 302 or the feed belt 303 is read by performing the image reading operation described above by reference to FIG. 8, the original document is discharged on an upper surface of the ADF 300 by the feed belt 303 and a feed roller 304. In this regard, the operation of a controller (not shown) and the ADF 300 to feed the original document to the glass document table 101 by the ADF is as follows.

A feed motor of the ADF 300 is driven by a signal output by a controller of the image forming apparatus. Specifically, when a print key on an operation panel is pushed and thereby a feed start signal is input to the controller, the controller normally or reversely rotates the feed motor. When the feed motor is normally rotated, the feed roller 302 is clockwise rotated, thereby feeding the uppermost sheet of the original document sheets set on the document tray 301 toward the reading slit 111 or the glass document table 101. When the rear edge of the fed original document sheet is detected by a detector 305, the controller reversely rotates the feed motor under a detection signal output by the detector 305, thereby preventing the following original document sheet from being fed by the feed roller 302.

In addition, the controller counts the number of rotation pulses of a feed belt motor for feeding the feed belt 303 from a time when the rear edge of the fed original document sheet is detected by the detector 305. When the counted number of rotation pulses reaches a predetermined number, the controller stops driving of the feed belt motor to stop the feed belt 303 so that the fed document sheet is stopped at the reading position on the glass document table 101. Further, when the rear edge of the fed original document sheet is detected by the detector 305, the controller normally rotates again the feed motor to feed the following original document sheet in the same way toward the glass document table 101. Similarly to the first original document sheet, when the counted number of rotation pulses reaches a predetermined number, the controller stops driving of the feed belt motor to stop the feed belt 303 so that the second original document sheet is stopped at the reading position on the glass document table 101. The following original document sheets are also fed in the same way toward the glass document table 101.

When an original document sheet is stopped at the reading position, the image of the original document sheet is read. When the image reading operation is completed, a signal is input to the controller, and the controller normally rotates the feed belt motor to feed the original document sheet on the glass document table 101 toward the feed roller 304 so that the document sheet is discharged from the ADF 300.

Thus, when the print key is pushed, the original document sheets on the document tray 301 are sequentially fed from the uppermost sheet toward the reading position (for example, the reading position on the glass document table 101).

After the image of the original document sheet stopped at the reading position is read, the original document sheet is discharged from the exit by the feed belt 303 and the feed roller 304. In addition, when it is detected that another original document sheet is present on the document tray 301, the original document sheet is also fed in the same way toward the glass document table 101.

The uppermost paper sheet of recording papers on one of feed trays, i.e., a first, second or third tray 201, 202 or 203, are fed by a first, second or third feed unit 211, 212 or 213, respectively, toward a vertical feed unit 214. The recording paper sheet is then fed by the vertical feed unit 214 to a transfer position, at which the paper sheet is contacted with a photoreceptor drum 215 serving as an image bearing member. In reality, one of the first, second and third trays 201, 202 and 203 is selected, and recording papers on the selected tray are fed one by one. Recording sheets (such as plastic film sheets) other than paper sheets can also be used.

Meanwhile, according to the image data read by the image reading device 100, a writing unit 250 irradiates the photoreceptor drum 215, which has been charged by a charging unit 225, with laser light, resulting in formation of an electrostatic latent image on the surface of the photoreceptor drum. The electrostatic latent image is developed by a developing unit 227, resulting in formation of a toner image on the surface of the photoreceptor drum 215. In this regard, the charging unit, writing unit and developing unit constitute an image forming device.

The recording paper sheet fed from the feed tray by the feed unit 211, 212 or 213 and the feed unit 214 is fed by a feed belt 216 at the same speed as that of the photoreceptor drum 215 so that the toner image on the photoreceptor drum is transferred onto the recording paper. In this regard, the feed belt 216 serves as a transfer device. The toner image is then fixed to the recording paper by the fixing unit 217, and the recording paper having the fixed toner image thereon is discharged on a discharge tray 219 by a discharge unit 218. The transfer device and the fixing device also serves as members of the image forming device.

When face down discharging is performed, i.e., when the recording paper is discharged while the image faces down so as to be stacked in the order of pages, the recording paper having a fixed image thereon is reversed. Specifically, the recording paper is fed to a duplex feed passage 220 by the discharge unit 218, and then switched back at a reverse unit 221. The recording paper is then discharged on the discharge tray 219 via a reverse discharge passage 222.

In order to prepare a duplex copy, after the recording paper having an image on one side thereof is fed to the duplex feed passage 220 by the discharge unit 218, the recording paper is switched back at the reverse unit 221, and then fed to a duplex feed unit 223. The recording paper is then fed again to the transfer position by the duplex feed unit 223 and the vertical feed unit 214. After another toner image is transferred onto another surface of the recording paper, the toner image is fixed by the fixing unit 217, and the duplex copy is discharged on the discharge tray 219 by the discharge unit 218.

The photoreceptor drum 215, feed belt 216, fixing unit 217, discharge unit 218 and developing unit 227 are driven by a main motor (not shown), and the driving force of the main motor is transmitted to the feed units 211-213 via respective feed clutches. In addition, the driving force of the main motor is transmitted to the vertical feed unit 214 via an intermediate clutch.

The writing unit 250 includes a laser output unit 251, a focusing lens 252, and a mirror 253. The laser output unit 251 includes a laser diode serving as a laser light source, and a polygon mirror or a vibration mirror to scan the laser light emitted by the laser diode. Laser light emitted by the laser output unit 251 is deflected by the polygon mirror or vibration mirror, and the deflected light is focused on the surface of the photoreceptor drum 215 after passing through the focus lens 252 and being reflected by the mirror 253.

The image forming apparatus according to the sixth embodiment of the present invention include the image reading device of the fifth embodiment, and forms an image on a recording material according to the read image data. Therefore, image formation is performed without deteriorating productivity (image formation throughput), i.e., without causing a problem in that output of a first copy is delayed. In addition, occurrence of the part damaging problem can be prevented. Namely, high quality images can be produced at a high speed, i.e., image formation processing is performed highly efficiently.

The image forming apparatus according to the sixth embodiment of the present invention is a digital copier. However, the image forming apparatus of the present invention is not limited thereto, and can be applied to other image forming apparatuses such as analog image forming apparatuses, and multifunctional digital image forming apparatuses and facsimiles. Digital image forming apparatuses such as digital copiers include an image reading device including the light source driving device, and an image forming device to form an image on a recording material according to the read image data. By contrast, analog image forming apparatuses such as analog copiers do not include an image reading device, and include an image forming device in which an original document is irradiated with light beams emitted by plural light sources, which is driven by the light source driving device of the present invention, and a photoreceptor, which is previously charged by a charger, is irradiated with the light beams reflected from the original document to form an electrostatic latent image thereon, followed by the developing, transferring and fixing operations.

As mentioned above, the light source driving device of the present invention drives plural light source to irradiate an object with light beams emitted thereby. The light source driving device can perform the voltage boosting operation without generating excess voltage in parts of circuits such as CCDs receiving the reflected light beams and processors processing the image data obtained by the CCDs. Therefore, the image processing device, image reading device and image forming apparatus using the light source driving device can perform image processing operation, image reading operation and image forming operation at a high speed with high precision.

Additional modifications and variations of the present invention are possible in light of the above teachings. It is therefore to be understood that within the scope of the appended claims the invention may be practiced other than as specifically described herein.

This document claims priority and contains subject matter related to Japanese Patent Application No. 2010-091543, filed on Apr. 12, 2010, the entire contents of which are herein incorporated by reference.

What is claimed is:

1. A light source driving device for driving plural light sources, comprising:
   a voltage booster to perform a voltage boosting operation of boosting a supply voltage from a power source to supply the boosted voltage to each of the plural light sources;
   a constant current driver to regularly hold driving current for each of the plural light sources constant;
   a load, that is separate from the plural light sources, to consume substantially a same power as all of the plural light sources; and
   a switch to perform a switching operation of selectively connecting either the load or the plural light sources with the voltage booster and the constant current driver so that either the load or the plural light sources are connected and positioned in between the voltage booster and the constant current driver.

2. The light source driving device according to claim 1, wherein the switch connects the load with the voltage booster and the constant current driver from start of the voltage boosting operation of the voltage booster to completion of the voltage boosting operation, and connects the plural light sources with the voltage booster and the constant current driver after completion of the voltage boosting operation.

3. The light source driving device according to claim 2, wherein the switch performs the switching operation in synchronization with an external control signal.

4. The light source driving device according to claim 2, wherein the constant current driver is activated by an external start signal, and wherein the constant current driver includes a signal generator generating a signal under the external start signal to allow the switch to perform the switching operation.

5. The light source driving device according to claim 1, further comprising:
   a shutoff device to electrically shield the plural light sources from each other.

6. The light source driving device according to claim 5, wherein the shutoff device is a diode.

7. The light source driving device according to claim 1, wherein the load is a resistor.

8. The light source driving device according to claim 1, wherein the light source driving device is a single integrated circuit.

9. An image processing device comprising:
   plural light sources to irradiate an object;
   the light source driving device according to claim 1 to drive the plural light sources;
   an image sensor to receive light reflected from the object while generating analog signals; and
   a processor to process the analog signals.

10. The image processing device according to claim 9, wherein the image processing device is an image reading device, and wherein the processor processes the analog signals to obtain image data of the object.

11. An image forming apparatus comprising:
   the image processing device according to claim 10 to read image data of an object; and
   an image forming device to form an image on a recording material according to the read image data.

12. The image forming apparatus according to claim 11, wherein the image forming device includes:
an image bearing member;
a charger to charge the image bearing member;
an irradiator to irradiate the charged image bearing member with light to form an electrostatic latent image on the image bearing member;
a developing device to develop the electrostatic latent image with a developer to form a toner image on the image bearing member;
a transferring device to transfer the toner image onto a recording material; and
a fixing device to fix the toner image on the recording material.

13. An image forming apparatus comprising:
the light source driving device according to claim 1;
plural light sources to irradiate an object while being driven by the light source driving device; and
an image forming device to form an electrostatic latent image on an image bearing member with light reflected from the object.

14. The image forming apparatus according to claim 13, wherein the image forming device includes:
the image bearing member;
a developing device to develop the electrostatic latent image on the image bearing member with a developer to form a toner image on the image bearing member;
a transferring device to transfer the toner image onto a recording material; and
a fixing device to fix the toner image on the recording material.

15. A light source driving device for driving plural light sources, comprising:
voltage boosting means for performing a voltage boosting operation of boosting a supply voltage from a power source to supply the boosted voltage to each of the plural light sources;
constant current driving means for regularly holding driving current for each of the plural light sources constant;
load means for consuming substantially a same power as all of the plural light sources, the load means is separate from the plural light sources; and
switching means for performing a switching operation of selectively connecting either the load or the plural light sources with the voltage boosting means and the constant current driving means so that either the load or the plural light sources are connected and positioned in between the voltage boosting means and the constant current driving means.

* * * * *